Aug. 2, 1966     A. J. DRAGONETTI ET AL     3,263,565
ROTATING CLUSTER TYPE ROCKET LAUNCHER
Filed Oct. 31, 1962     10 Sheets-Sheet 3

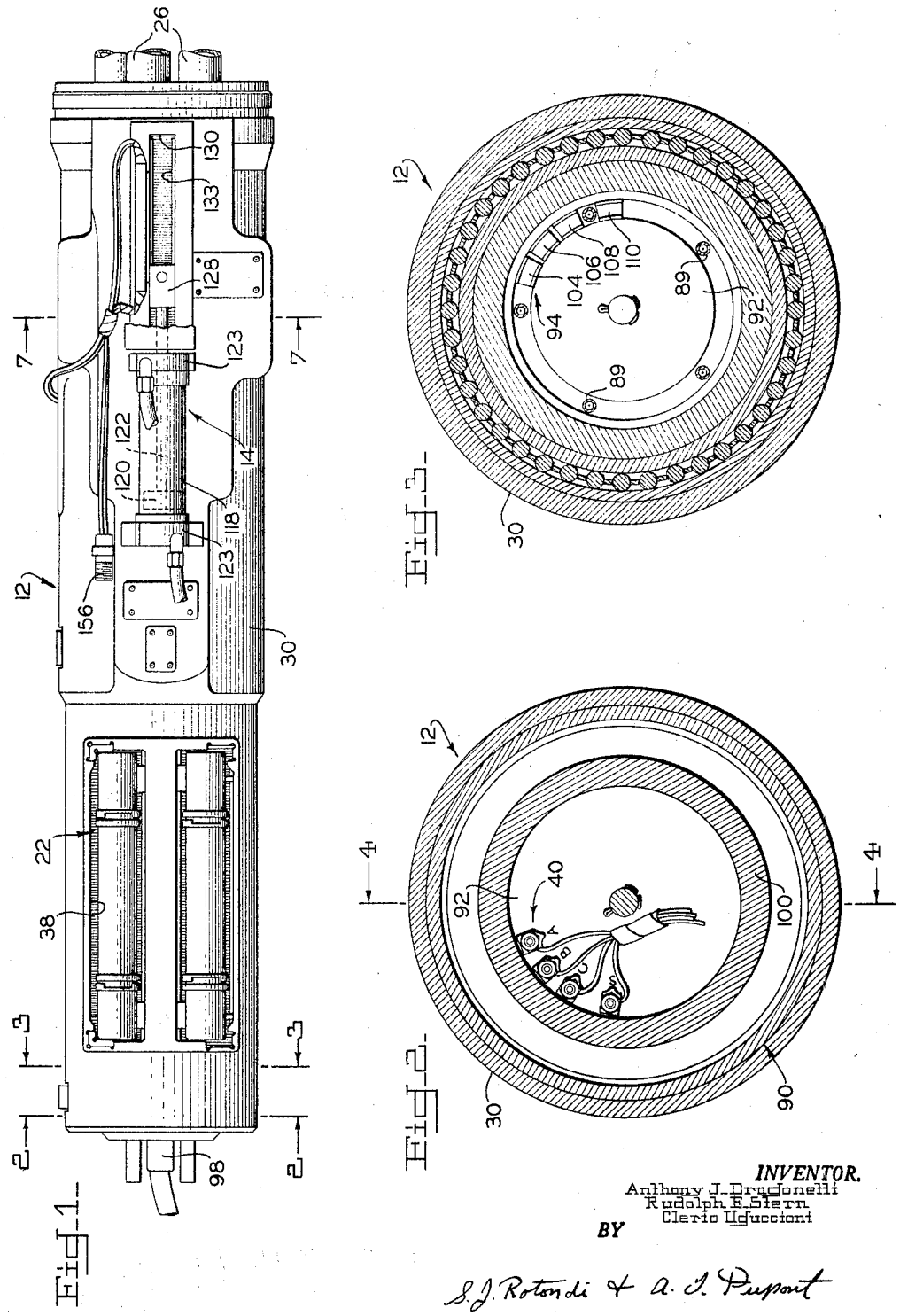

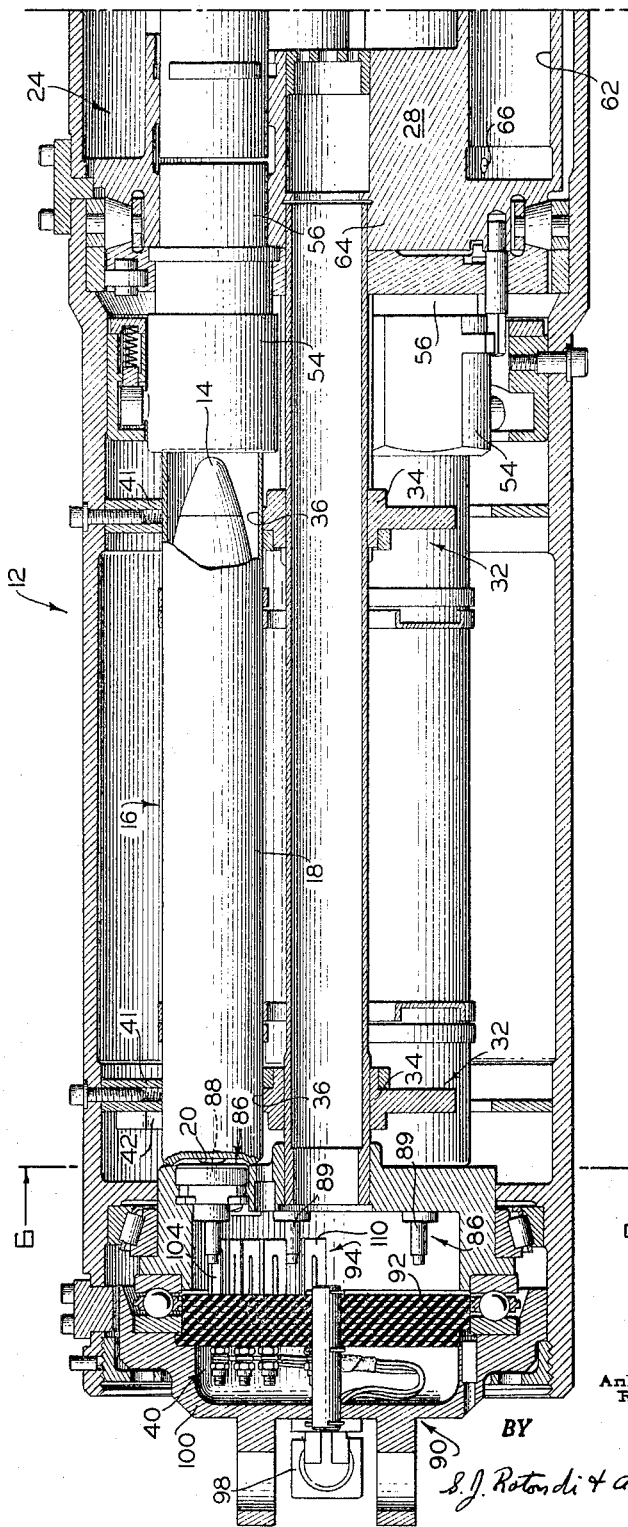

INVENTOR.
Anthony J. Dragonetti
Rudolph E. Stern
Clerio Uguccioni
BY
S. J. Rotondi & A. T. Dupont INVENTOR.
Anthony J. Dragonetti
Rudolph E. Stern
Clerio Uguccioni
BY
S. J. Rotondi & A. J. Dupont

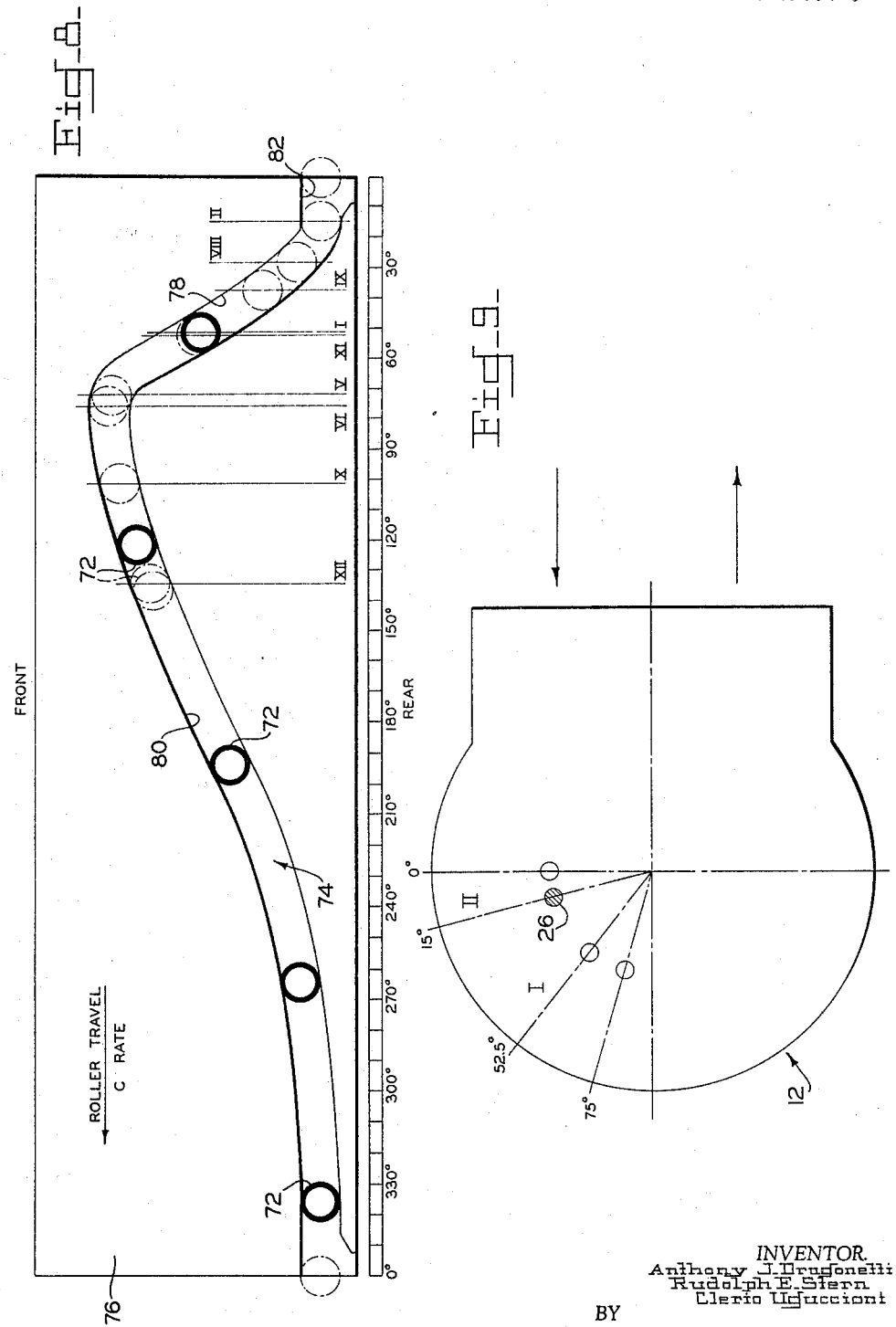

Aug. 2, 1966   A. J. DRAGONETTI ET AL   3,263,565
ROTATING CLUSTER TYPE ROCKET LAUNCHER
Filed Oct. 31, 1962   10 Sheets-Sheet 6
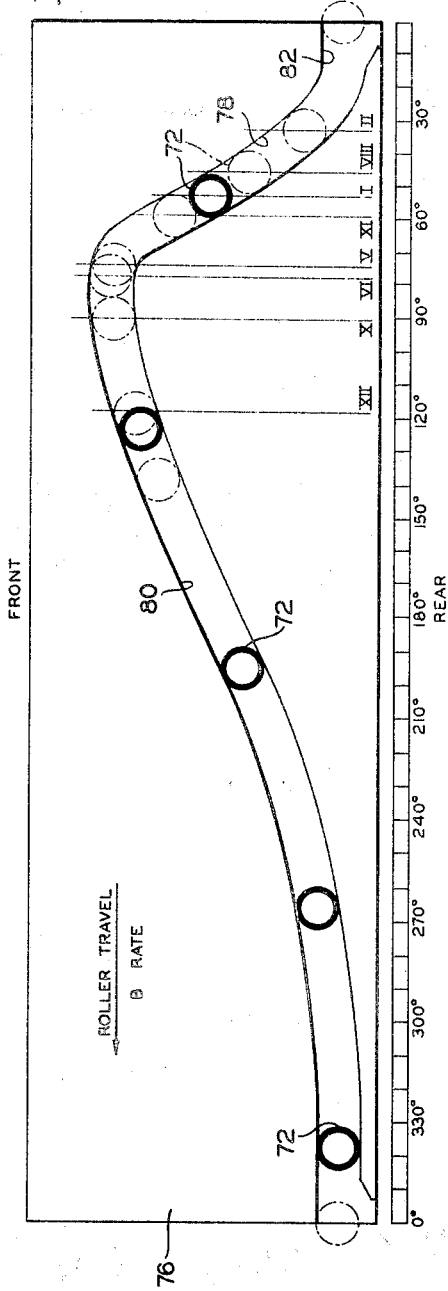
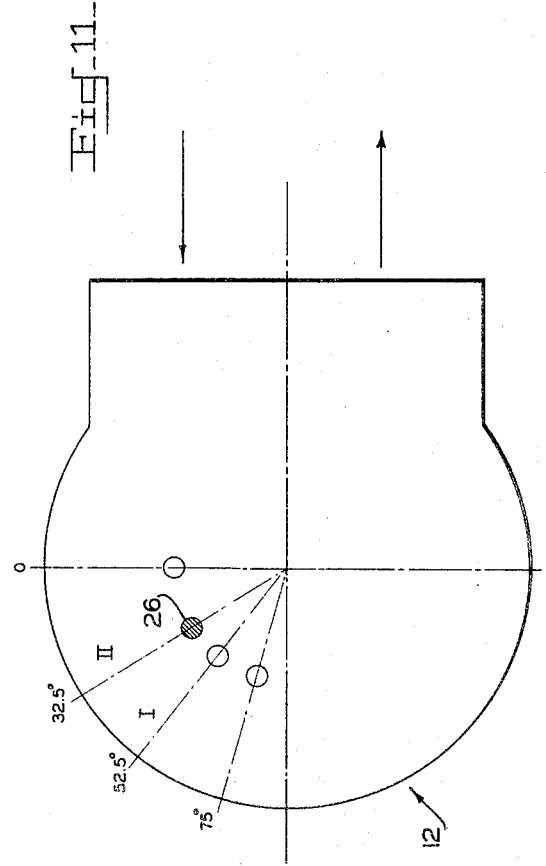
INVENTOR.
Anthony J. Dragonetti
Rudolph E. Stern
Clerio Uguccioni
BY
S. J. Rotondi & A. J. Dupont

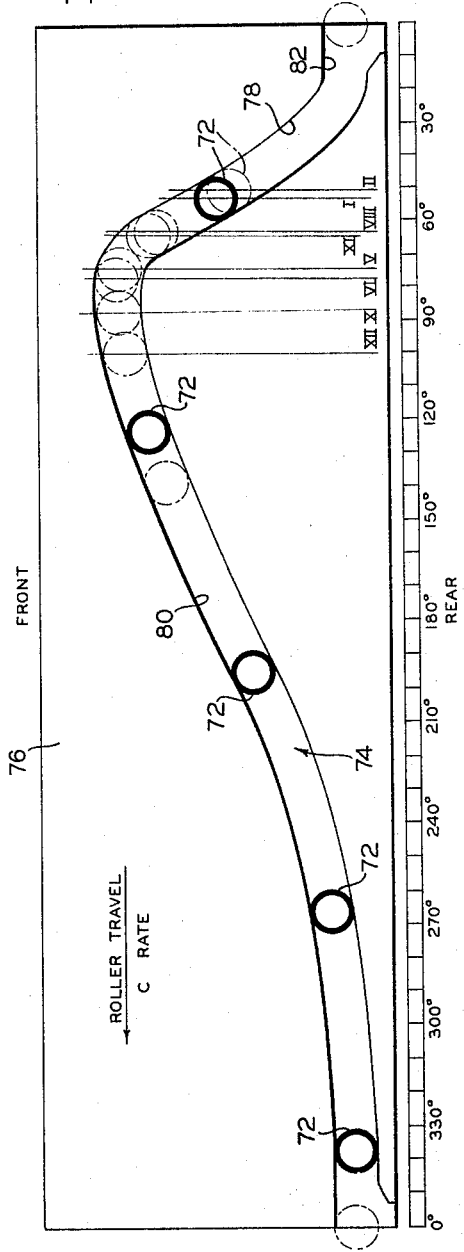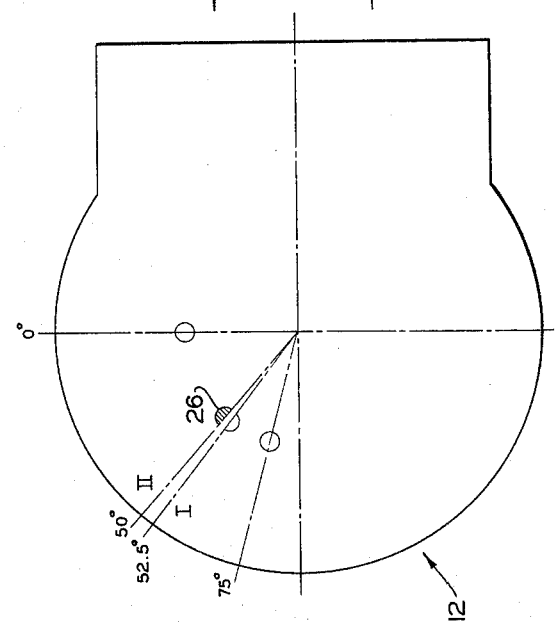

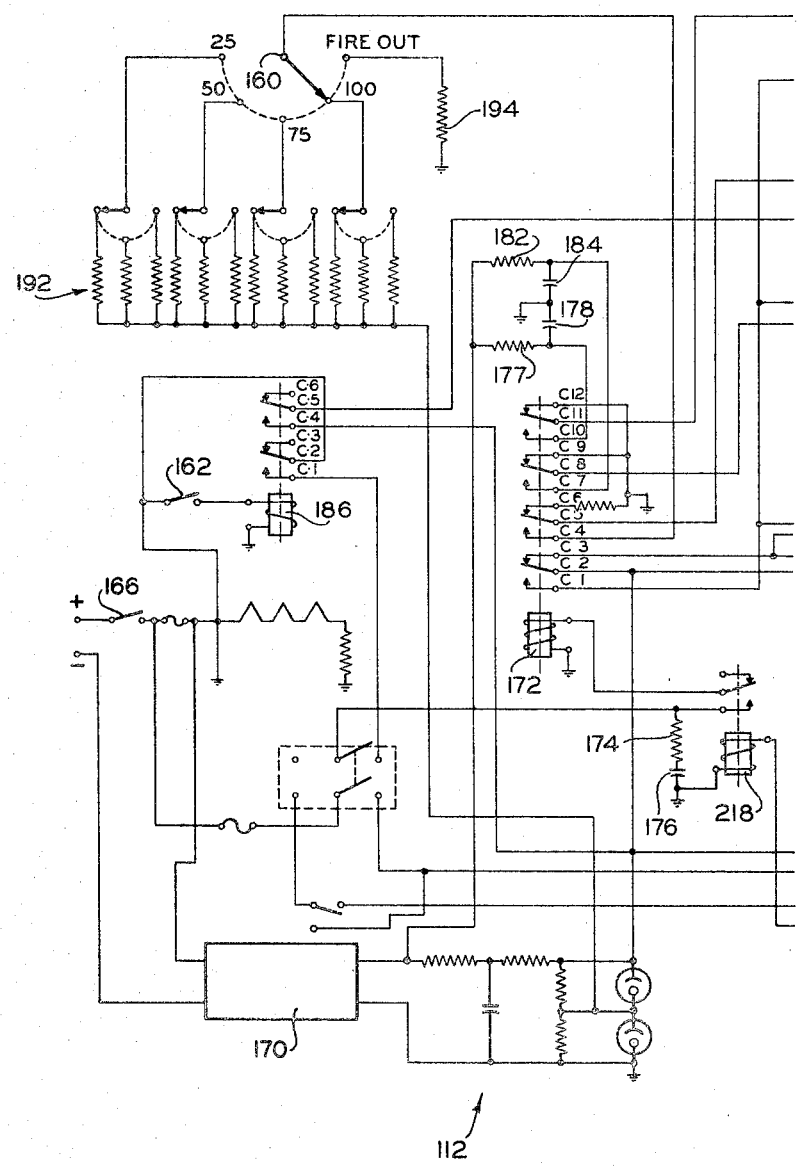

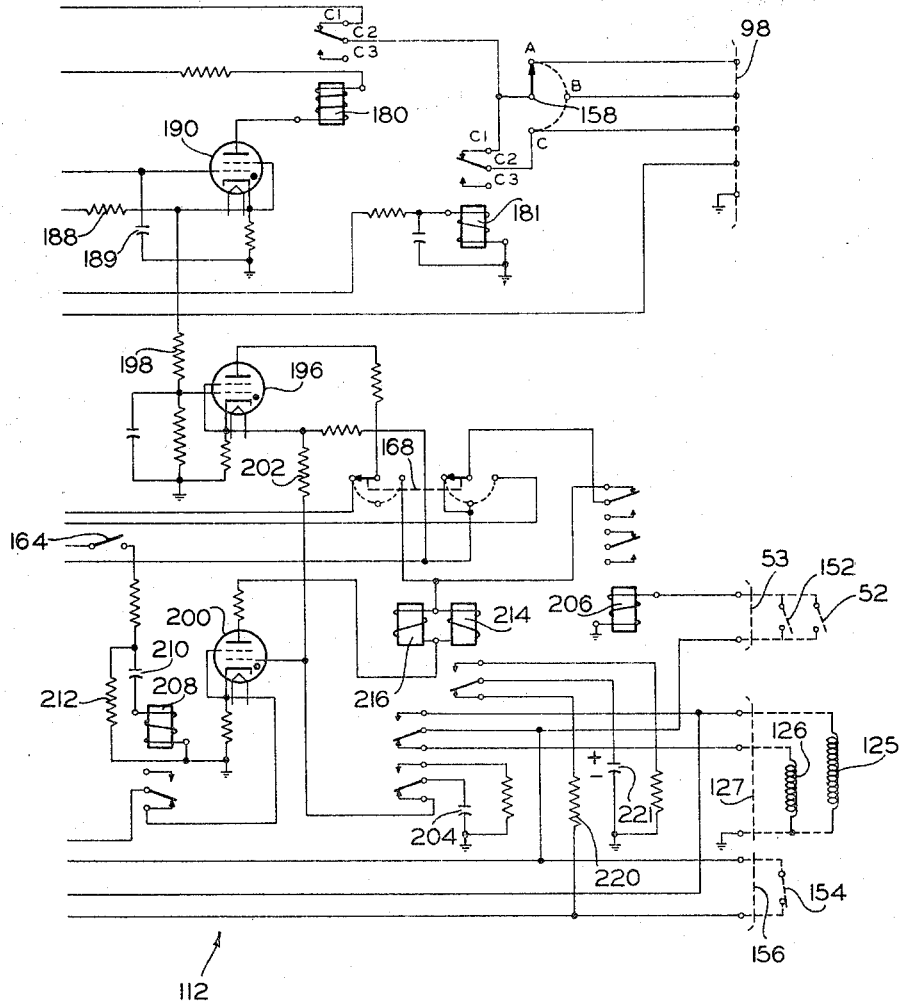

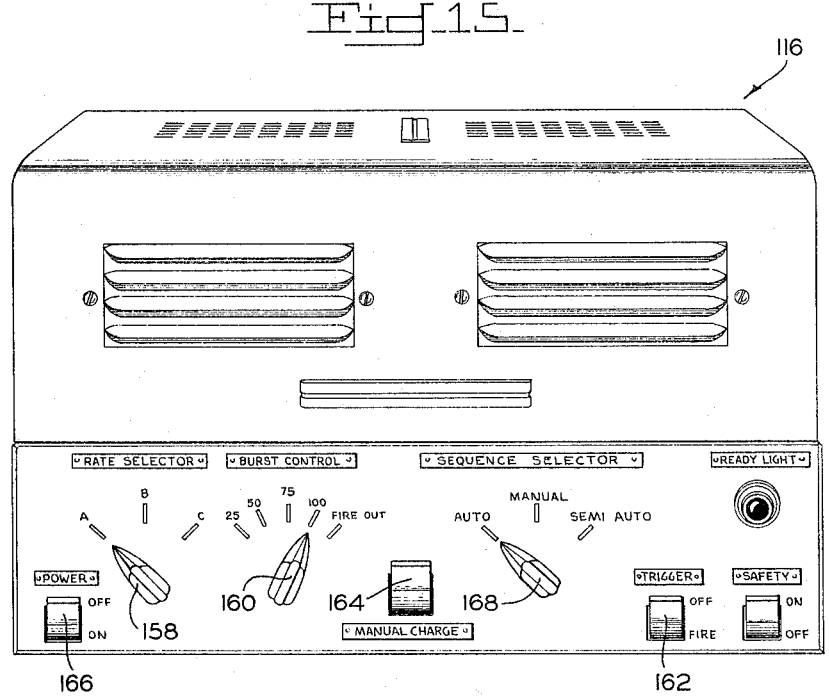

United States Patent Office 3,263,565
Patented August 2, 1966

3,263,565
ROTATING CLUSTER TYPE ROCKET LAUNCHER
Anthony J. Dragonetti, Sunnyvale, Calif., and Rudolph E. Stern, Skokie, and Clerio Uguccioni, Chicago, Ill., assignors, by mesne assignments, to the United States of America as represented by the Secretary of the Army
Filed Oct. 31, 1962, Ser. No. 234,569
7 Claims. (Cl. 89—1.804)

This invention relates to automatic guns of the Gatling type and more particularly to the firing systems thereof.

It is one object of this invention to provide for automatic guns, which are of the Gatling type and which are self-powered, a firing system designed to operate in any one of several readily selected firing rates with each of the firing rates being selectively available in sequences including automatic fire, automatically sequenced multiple-bursts, semiautomatic fire and semiautomatically sequenced multiple-bursts.

It is another object of this invention to provide for such guns a braking action incorporated within the firing system for automatically stopping the operation of the gun when each burst is completed and when the trigger is released.

It is a further object of this invention to provide for such guns a device for automatically charging the gun after being stopped at the completion of a burst or by release of the trigger.

It is a still further object of this invention to provide a firing system which has a wide variety of firing sequences but which is simple in design and positive in operation.

The specific nature of the invention as well as other objects and advantages thereof will clearly appear from a description of a preferred embodiment as shown in the accompanying drawings in which:

FIG. 1 is a side view of the rocket launcher except for the fire control circuit which is remotely disposed in a separate control box;

FIG. 2 is a view taken along line 2—2 of FIG. 1;

FIG. 3 is a view taken along line 3—3 of FIG. 1;

FIG. 4 is a cross-sectional view of the rear portion of the launcher, taken along line 4—4 of FIG. 2;

FIG. 8 is a diagrammatic view of the cam groove of the launcher energizing motor showing the different positions at which the cam followers are energized by discharge gas pressure when the launcher is programmed to fire at "A" rate;

FIG. 9 is a cross-sectional diagrammatic view showing the different positions at which the launching tubes are fired during operation of the launcher at "A" rate;

FIG. 10 is a view similar to FIG. 8 but shows the positions of the cam followers when the launcher is programmed to fire at "B" rate;

FIG. 11 is a view similar to FIG. 9 but shows the positions at which the launching tubes are fired during operation of the launcher at "B" rate;

FIG. 12 is a view similar to FIGS. 8 and 10 but shows the positions of the cam followers when the launcher is programmed to operate at "C" rate;

FIG. 13 is a view similar to FIGS. 9 and 11 but shows the positions at which the launching tubes are fired during operation of the launcher at "C" rate;

FIG. 14 is a diagram of a portion of the fire control circuit;

FIG. 14a is a diagram of the remaining portion of the fire control circuit; and

FIG. 15 is a front view of the fire control circuit box.

Figure 5:
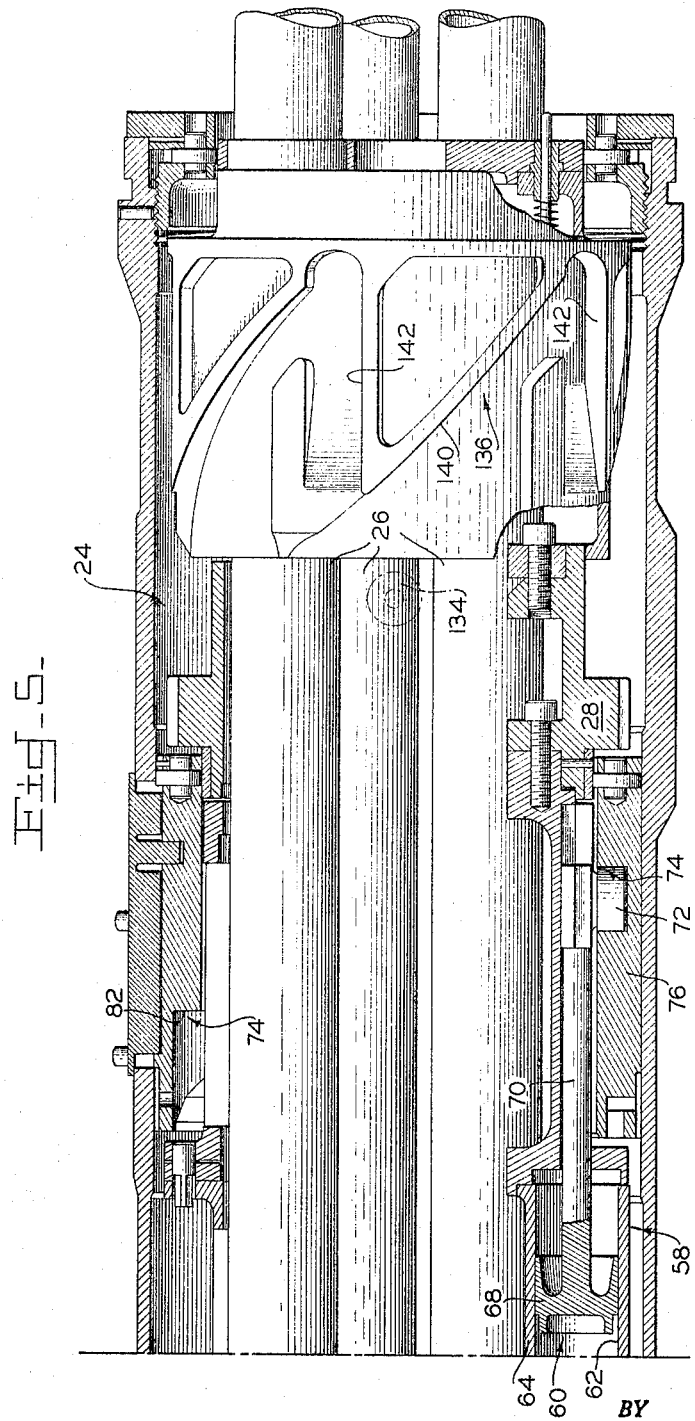
FIG. 5 is a continuation of FIG. 4 showing a cross-sectional view of the front portion of the launcher with the sleeve having the charger cam track shown in full.
Figure 6:
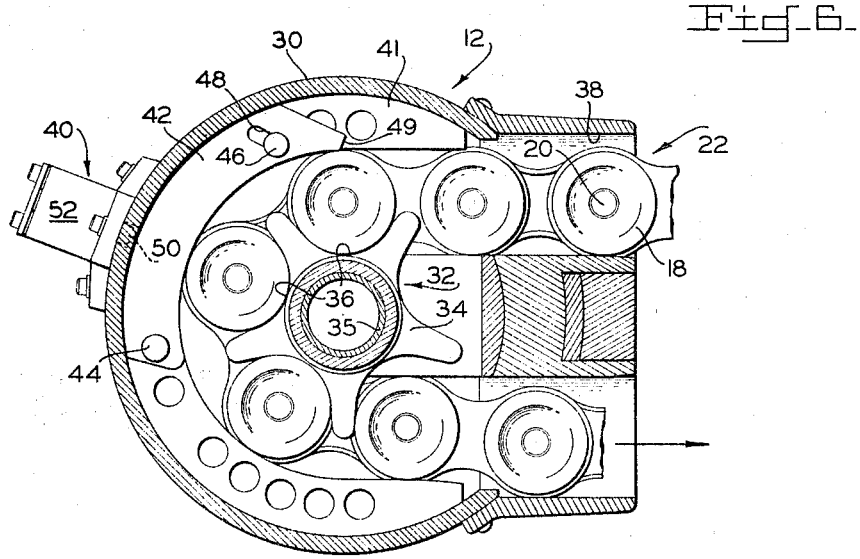
FIG. 6 is a view taken along line 6—6 of FIG. 4.
Figure 7:
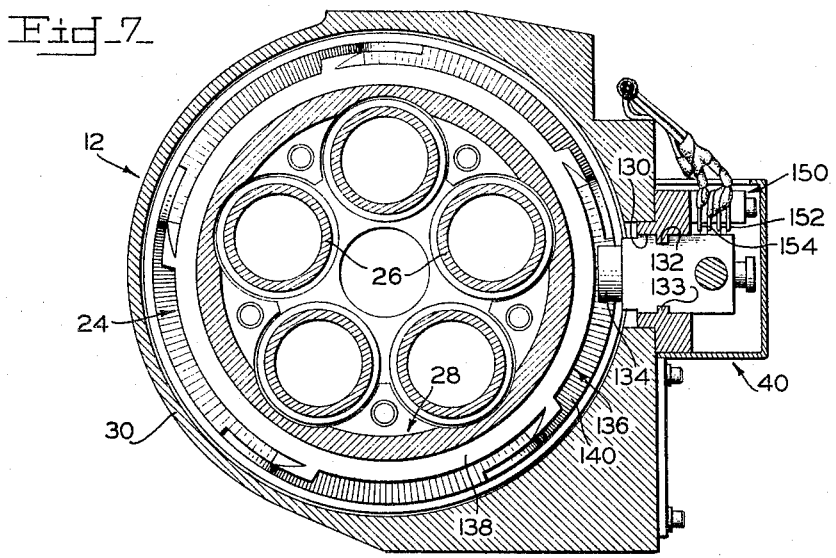
FIG. 7 is a view taken along line 7—7 of FIG. 1.

Shown in the figures is a launcher 12 for rockets 14. Each of the rockets 14 is contained within a complete round 16 which also includes a cylindrical cuplike case 18 and an electrically initiated primer 20 for igniting a charge which propels the rocket from the case. Rounds 16 are linked together to form a belt 22.

Launcher 12 is an automatic gun of the Gatling type and contains a rotatable cluster 24 which includes five launching tubes 26 and a drum assembly 28 which supports the rear ends of the tubes. Tubes 26 are bracketed together and are supported by drum assembly 28 so as to be equally spaced and centered around the center line of launcher 12. Drum assembly 28 is journaled in the front section of a receiver 30 for rotation about the center line of cluster 24.

Located in the rear section of receiver 30 is a feeding mechanism 32 which includes a pair of longitudinally spaced sprocket wheels 34 connected to drum assembly 28 for rotation therewith by means of an axial shaft 35 on which the sprocket wheels are mounted. Each of the sprocket wheels 34 is provided with five semicircular intertooth pockets 36 each of which has a radius similar to that of the outside of case 18. The pockets 36 in each sprocket wheel 34 are aligned with those in the opposite one thereof and with the corresponding one of the tubes 26 so that, when a round 16 is fully seated in the aligned pockets, it is positioned thereby in coaxial alignment with the related tube. Rotation of sprocket wheels 34 draws belt 22 through receiver 30 and positions successive ones of the rounds 16 in alignment with successive ones of the tubes 26.

Belt 22 enters receiver 30 and exits therefrom through a port 38 in the right side thereof to form a U-section and thereby each round 16 is in alignment with one of the tubes 26 during approximately 180° of rotation of cluster 24. During this 180° of rotation, each round 16 is obturated respective to its associated tube 26 when passing through a battery station, fired in a firing section of the battery station by a firing system 40 and then unsealed from the tube.

Cases 18 are maintained in full contact with the receiving pockets 36 by a pair of semicircular rail guides 41 fixed within the receiver with one positioned adjacent each of the sprocket wheels 34. Pivotally mounted on the rear one of the guides 41 is a sensor 42 which indicates when a round is in the battery station. Sensor 42 is of arcuate configuration, with a radius similar to that of the supporting guide 41, and is pivotally mounted at one end by means of a pin 44 to such guide so as to extend in a counterclockwise direction from the pin.

Sensor 42 is pivotally displaceable between an extended position, wherein the free end projects inwardly from the supporting guide 41, and a retracted position, wherein the sensor is in alignment therewith. The pivotal displacement is limited by the cooperation of a pin stop 46 on rear guide 41 with a slot 48 in the sensor. Provided on the free end of sensor 42 is a cam surface 49 which extends in a clockwise direction from such end and inwardly towards the smaller diameter surface of the sensor. When sensor 42 is in the extended position, cam surface 49 is contactable by case 18 when passing through the battery station so as to cam the sensor 42 to the retracted position. Sensor 42 is held in the retracted position by each round 16 as it is moved along guides 41 but the length of the sensor is short enough so that it is released to be pivoted to the extended position in time to indicate whether a subsequent round is positioned by sprocket wheels 34 at the battery station.

Sensor 42 is biased to the extended position by a spring-biased plunger 50 which has engagement with an electrical belt switch 52 in firing system 40. Belt switch 52 is closed when sensor 42 is in the extended position and open when the sensor is in the retracted position and is connected electrically to firing system 60 through a junction plug 53 as hereinafter described.

Obturation of cases 18 with the related tubes 26 at the battery station is achieved by sealing sleeves 54 which are slidingly mounted on cooperating collars 56 provided in drum assembly 28 in coaxial alignment with each of the tubes. Sealing sleeves 54 are cam actuated responsive to rotation of cluster 24 into and away from sealing contact with the front end of the aligned case 18.

Cluster 24 is rotated in a counterclockwise direction by a motor 58 which is energized by gas pressure produced when rounds 16 are discharged. Motor 58 includes five piston assemblies 60 which are slidingly mounted in cooperating cylinders 62 longitudinally disposed in a cage 64 which is part of drum assembly 28. A port 66 provides communication between each of the tubes 26 and the rear end of the associated cylinder 62 to permit passage of gas pressure from the tubes into the cylinders to drive piston assemblies forwardly.

Each of the piston assemblies 60 includes a piston 68, a rod 70 extending coaxially therefrom and a roller follower 72 mounted on the free end of the rod so that the axis of the follower is disposed at right angles to the central axis thereof. All of the roller followers 72 are received by an endless cam groove 74 formed inside of a cylindrical insert 76 which is fixed to receiver 30 within the front section thereof.

Cam groove 74 is generated so as to have a longitudinal component of displacement equal to the length of the stroke of piston assemblies 60 and, by being endless, the cam groove has a 360° angular component of displacement. Cam groove 74, as is best shown in FIGS. 8, 10 and 12, includes a drive section 78 which slopes forwardly the distance of the longitudinal component of displacement and angularly approximately 70° in a clockwise direction. A recovery section 80 extends in a clockwise direction from drive section 78 and is generated to slope rearwardly the distance of the longitudinal component of displacement and angularly 275° in a clockwise direction. A dwell section 82 extends without slope between recovery section 80 and drive section 78 to complete the endless configuration of cam groove 74.

Mounted on the rear end of shaft 35, by suitable spline means, is a circular breechblock 84 which has contact with the rear ends of cases 18, as they are moved through receiver 30, to support the cases during discharge. Five firing pin assemblies 86 are replaceably mounted in breechlock 84 so as to be coaxially aligned with each of the tubes 26. Each of the firing pin assemblies 86 includes a spring-pressed firing pin 88, which makes resilient contact with primers 20 during passage of rounds 16 through the battery station, and a drawbar 89 which is electrically connected to the firing pin and is arranged to extend rearwardly from breechblock 84.

The rear end of receiver 30 is closed by a breech assembly 90 which includes a circular plate 92 through which four electrical contacts 94 are mounted. Contacts 94 are respectively connected by electrical leads to a junction plug 98 mounted on a cover 100 of breech assembly 90. Contacts 94 extend forwardly from plate 92 so as to be successively contacted by drawbars 89 as firing pins 88 pass through the firing section of the battery station.

Contacts 94 include, in counterclockwise order looking forwardly towards the breech end of receiver 30 (clockwise in FIG. 3), a first contact 104, a second contact 106, a third contact 108, and a fourth contact 110, and such contacts are electrically connected through junction box 98 to a fire control circuit 112 in firing system 40 so as to be selectively energized, as hereinafter described.

Referring to FIG. 9, first contact 104 is positioned so that the edge thereof first contacted by drawbars 89 is contacted thereby when the longitudinal axis of the related tube 26 is positioned 15° past the position wherein the longitudinal axis is first coincident with the central vertical plane of receiver 30 and a round 16 becomes coaxially aligned with one of the tubes 26, which position will be referred to hereinafter as the zero position for each tube. The position of tubes 26, where the related firing pin assembly makes contact with first contact 104 and round 16 is discharged, if the first contact is energized, will be referred to as position II.

Now referring to FIG. 11, second contact 106 is positioned to be similarly contacted by drawbars 89 when the longitudinal axis of the related tube 26 is positioned 32.5° past the zero position and such contact position will be referred to as position III.

Third contact 108, as shown in FIG. 13, is contacted by drawbars 89 when the related tube 26 is positioned 50° past zero position and such contact position will be referred to as position IV. Fourth contact 110 is similarly contacted by each drawbar 89 when the related tube 26 is positioned 75° past the zero position and such contact position will be referred to hereinafter as position V.

Cluster 24 is automatically indexed in a starting position, hereinafter referred to as position I, at the completion of each firing burst by a charger 114 which is programmed for operation, as hereinafter described, by a fire control circuit 112 which is housed in a box 116 remotely located from launcher 12 and is electrically connected thereto by suitable leads. Position I of each tube is where the longitudinal axis thereof is located 52.5° past zero position so that the related drawbar 89 is in positive contact with third contact 108. When position I is located 52.5° past zero position, full contact between the drawbars and third contact is assured as third contact 108 is first contacted 50° past zero position by drawbars 89.

Charger 114 is mounted on the outside of receiver 30 and includes a cylinder 118 which is longitudinally disposed thereon. A piston 120 is slidingly mounted in cylinder 118 for longitudinal reciprocation in forward and rearward strokes, and a shaft 122 is coaxially joined thereto for extension from the front end of the cylinder. Piston 120 is of double-acting type and, therefore, cylinder 118 is sealed liquid tight at both ends. A coupling 123 is provided at both ends of cylinder 118 to permit the introduction of liquid pressure thereinto on opposite sides of piston 120 by means of conduits which join the couplings to a conventional solenoid actuated valve (not shown) which controls the application of liquid pressure from a source (not shown) to either end of cylinder 118. The valve is actuated by a front electric solenoid 125 and a rear electric solenoid 126 (FIG. 14a). Solenoids 125 and 126 are electrically connected by leads to a junction plug 127.

Fixed to the free end of shaft 122 is a crosshead 128 which extends through a longitudinal slot 130 into receiver 30. Crosshead 128 is provided with longitudinal grooves 132 in the sides thereof which grooves slidingly receive mating flanges 133 along the sides of slot 130 to provide sliding support for the crosshead. Crosshead 128 mounts a spring-biased cam roller 134 which has sliding contact with a cam track 136 formed around the outside of a sleeve 138 which encircles tubes 26 within the front end of receiver 30. Sleeve 138 is bracketed to tubes 26 so as to be fixed thereto for rotation with cluster 24. Cam track 136 includes five sloping surfaces 140 and five longitudinal channels 142 disposed therebetween. Each of the sloping surfaces 140 and one of the channels 142 is associated with each of the tubes 26. Forward displacement of cam roller 134 against one of the sloping surfaces 140 causes rotation of cluster 24 to index the associated tube 26 in position I, and the associated channel 142, by being longitudinally disposed, permits return of the cam roller without displacing the cluster. Cam roller 134 is disposed rearwardly of sleeve 138 when piston 120 is rearwardly positioned.

Mounted on the outside of receiver 30, alongside of slot 130, is a crosshead switch assembly 150 which includes a front crosshead switch 152 disposed for actuation by crosshead 128 when at the end of its forward stroke and a rear crosshead switch 154 actuatable by the crosshead when at the end of its rearward stroke. Front crosshead switch 152 is arranged parallel to belt switch 52 and is connected by electrical leads to junction plug 53 (FIG. 14a) mounted to receiver 30 and rear crosshead switch 154 is connected by electrical leads to a junction plug 156 also mounted to the receiver.

Launcher 12 is designed to operate at three firing rates which will be referred to as "A," "B," and "C" rates. "A" rate is the fast rate, "B" rate the medium rate, and "C" is the slow rate. When first contact 104 is energized, launcher 12 is driven at "A" rate because, as has been stated hereinbefore, when this contact is energized, follower 72, which is associated with the tube 26 being discharged, is adjacent the front end of drive section 78 of cam groove 74 and, therefore, the gas pressure produced by the discharge is effective against cluster 24 the longest possible period of time. Consequently, launcher 12 is driven at its maximum rate. When second contact 106 is energized, the gas pressure is effective against cluster 24 for a shorter period of time for less efficient utilization of the gas pressure and, therefore, launcher 12 operates at a slower speed. Discharge gas pressure is effective against cluster 24 for a still shorter period of time when firing pins 88 are energized through third contact 108 so that launcher 12 is operated at a still lower rate.

Launcher 12 is braked to a stop when firing pins 88 are energized through fourth contact 110 because, as has been brought out hereinbefore, when the firing pins are energized by such fourth contact, follower 72 of the associated tube being discharged is adjacent the rear end of drive section 78 and the discharge gas pressure becomes effective against the associated piston assembly 60 when the follower thereon is in recovery section 80. Consequently, the discharge gas pressure is applied against cluster 24 in a direction opposite to that in which the cluster is driven for firing operation and thereby the inertia in the cluster is reduced by the discharge gas pressure. When launcher 12 is operating at "A" rate, it requires between seven and eight rounds 16 to be fired to stop the launcher. Five to six rounds are required for braking purposes when launcher 12 is firing at "B" rate and full braking is achieved at "C" rate when three to four rounds are fired.

Launcher 12 is also designed to operate according to four types of firing sequences—automatic multiple bursts, semiautomatic multiple burst, full automatic, and semiautomatic. The firing rates and sequences are all programmed by fire control circuit 112 which is housed in box 116, and mounted on the instrument panel of this box are the fire controls for selectively programming the firing sequences. The fire controls include a rate selector switch 158, which is rotatable to three selective positions and is provided with three contacts respectively connected to first contact 104, second contact 106 and third contact 108 by means of electrical leads to junction plug 98; a burst selector switch 160 which is indexable at positions for selecting bursts of 25, 50, 75, and 100 rounds and "fire-out" for uninterrupted automatic fire; a trigger 162 actuatable to a fire position; a manual charging switch 164; a power control switch 166; and a sequence selector switch 168 indexable to "manual," "semiautomatic" and "automatic" positions.

Electrical leads extend from fire control circuit 112 to connect with junction plugs 53, 127, 155, and 156 on receiver 30. A dynamotor 170 in box 116 converts a 28-volt direct current, from a source of supply (not shown), to 400 volts direct current at 200 ma. The power input is controlled by power switch 166.

The four types of firing sequences are programmed by the proper setting of rate selector switch 158, burst selector switch 160 and sequence selector switch 168. Each firing sequence consists of a burst cycle, including the braking action; a charger triggering cycle; and a charging cycle.

In the automatic multiple-burst sequence, the entire complement of rounds 16 is expended in the firing of successive burst cycles of a preselected number of rounds at a preselected rate when trigger 162 is actuated and held in firing position. This sequence is programmed by indexing burst selector switch 160 at the setting for the desired number of rounds to be fired in each burst, indexing sequence selector switch 168 at the "automatic" position, and indexing rate selector switch 158 at the setting for the rate at which the burst is to be fired.

When trigger 162 is actuated and held in the firing position, a burst cycle is initiated. At the proper instant during the burst, the burst selector system of fire control circuit 112 disables the ignition circuit and initiates the braking action and the charger triggering cycle. At the proper instant, the charger triggering system initiates the charging cycle and, when charger 114 has completed its reciprocating cycle to index the next tube 26 at position I, the next burst cycle is initiated. This is automatically continued until the available rounds 16 in belt 22 are discharged or trigger 162 is released. When the last round 16 in belt 22 is discharged and no more rounds are positioned in the battery station, sensor 42 signals this to belt switch 52 which is actuated and the charging cycle of the sequence is disabled.

If trigger 162 is released during a burst cycle, the ignition circuit is interrupted and the braking action and the charger triggering cycle are initiated. The charging cycle, which follows, actuates the next tube 26 to position I ready to initiate another burst when trigger 162 is actuated.

In the semiautomatic multiple-burst firing sequence, a single burst cycle of a preselected number of rounds 16 is fired at a predetermined rate when trigger 162 is actuated and held in the firing position. This sequence is programmed by setting burst selector switch 160 to fire a preselected number of rounds for a burst, setting sequence selector switch 168 to "semiautomatic" position, and setting rate selector switch 158 to the desired rate.

When trigger 162 is actuated, a burst cycle including the braking action is fired. To complete the sequence, trigger 162 must be released to initiate the charger triggering cycle which, in turn, initiates the charging cycle which causes reciprocation of charger 114 to reset cluster 24 at its proper position ready for initiating another sequence. In the event that trigger 162 is released during a burst cycle, the ignition circuit is interrupted and the braking action and charger triggering cycle are initiated. The succeeding reciprocation of charger 114 resets cluster 24.

In the semiautomatic firing sequence, a burst cycle of a preselected number of rounds is fired when trigger 162 is actuated and held in firing position. This sequence is programmed by setting burst selector switch 160 to fire the desired number of rounds 16 for a burst, setting the sequence selector switch 168 to the "manual" position, and setting rate selector switch 158 to the desired rate.

When trigger 162 is actuated, a burst cycle is fired. No further activity takes place when trigger 162 is released after the firing is completed. To complete the sequence, the charger triggering cycle must be initiated by actuating manual charger switch 164 which cycles charger 114 for resetting cluster 24. When trigger 162 is reactuated, the next sequence is initiated. In the event that trigger 162 is released during a burst cycle, the ignition circuit is interrupted and the braking action is initiated. Charger 114 must be cycled by manual charger switch 164 to reset cluster 24.

In the "automatic" firing sequence, all of rounds 16 in belt 22 are expended when trigger 162 is actuated and held in the firing position. This sequence is programmed by setting burst selector switch 160 to the "fire-out" position. In the event that trigger 162 is released before all rounds 16 in belt 22 are expended, the events programmed by sequence selector switch 168 will occur automatically. Reactuating trigger 162 will initiate another single burst sequence.

The networks and electrical components of fire control circuit 112 for achieving the four firing sequences are shown diagrammatically in FIGS. 14 and 14a and are more fully explained hereinafter. Fire control circuit 112 includes a primary ignition circuit, which transmits the energy from dynamotor 170 to first contact 104, second contact 106 or third contact 108, as selected by rate selector switch 158, when trigger 162 is actuated, and a secondary circuit ignition circuit which transmits the electrical energy to fourth contact 110 to brake the rotation of cluster 24.

The primary and secondary circuits are controlled by a relay 172 which has a normal drop-out time of approximately 1.0 msec. A resistor 174 and a capacitor 176 are added in the control circuit for the relay so that the drop-out time thereof is increased to approximately 500 msec. This increased drop-out time sustains the secondary ignition circuit voltage to fire sufficient rounds 16 through fourth contact 110 to brake the rotation of cluster 24 when trigger 162 is released.

The primary ignition circuit provides voltage to first contact 104, second contact 106 or third contact 108 through a network which includes a resistor 177 and a capacitor 178 and which extends through contacts C10 and C11 of relay 172, contacts C3 and C2 of a relay 180, and rate selector switch 158 to junction plug 98 and so to such contacts.

The secondary ignition circuit provides voltage to fourth contact 110 through a network which includes a resistor 182 and a capacitor and which extends through contacts C7 and C8 of relay 172 to junction plug 98 and so to the fourth contact. Contacts C7 and C8 of relay 172 are closed when the relay is de-energized.

A first round ignition circuit provides voltage to discharge round 16 in position I to initiate a burst. This circuit includes resistor 177 and capacitor 178 and extends through contacts C10 and C11 of relay 172, contacts C2 and C3 of relay 180, contacts C2 and C3 of relay 181, and rate selector switch 158 to third contact 108.

Burst selector switch 160 determines the number of rounds 16 fired in a burst by determining the time period during which the primary ignition circuit is energized and is a switch arrangement for a network that controls the firing of a thyratron tube 190 as described hereinafter.

Each of the settings of burst selector switch 160 for the bursts of 25, 50, 75, and 100 rounds is connected to each setting of rate selector switch 158 by one of a blank of resistors 192, each resistor in the bank having a predetermined value so that the selected bursts may be fired at the selected rate. Because the time period of a selected burst will be shorter at "A" rate than at "B" rate and the time period will be shorter at "B" rate than at "C" rate, the resistors 192 for the three rate settings have different values. For instance, when burst selector switch 160 is set for 25-round bursts and rate selector switch 158 is set for "A" rate, the one of the resistors 192 introduced into the circuit has a value of 300K, for "B" rate the resistor has a value of 395K, and for "C" rate the resistor has a value of 415K. The "fire-out" setting of burst selector switch 160 is controlled by a resistor 194 having a value of 1.5M.

When trigger 162 is actuated, relay 172 is energized and the following events occur simultaneously:

(1) The first round ignition circuit is energized.

(2) A bias voltage ($E_b$=90 volts D.C.) is applied to the cathode of tube 190 through contacts C4 and C5 of a relay 186 and a resistor 188.

(3) The plate voltage ($E_p$=+300 volts D.C.) is applied to tube 190 through contacts C1 and C2 of relay 172.

(4) A potential ($E$=+150 volts D.C.) is applied to the control grid circuit of tube 190 through burst selector switch 160 and contacts C4 and C5 of relay 172. The grid voltage ($E_g$) on tube 190, which initially is zero, begins to increase according to the relation:

$$E_g = E(1 - e^{-t/RC})$$

where, $R$=the value of the one of the resistors 192 selected by the setting of rate selector switch 158 and burst selector switch 160; and $C$=the value of a capacitor 194 in the delay stage circuit which capacitor in the present embodiment has a value of 1 mf.

The finite time for the fixed bias of tube 190 to be overcome, and the tube fires, is determined by the following relation:

$$t = RC \log \frac{E}{E - E_b}$$

When tube 190 fires, relay 172 is energized to interrupt the primary ignition circuit by opening contacts C10 and C11 of such relay and simultaneously initiate the braking action by closing contacts C7 and C8 thereof.

When sequence selector switch 168 is set at the "automatic" position and tube 190 is fired by action of the burst control network, the following events occur:

(1) The increase in positive voltage on the cathode of tube 190 is applied to the control grid of a tube 196 through a resistor 198 and tube 196 conducts.

(2) The cathode voltage of tube 196 increases and is applied to the control grid of a tube 200 through a resistor 202. A capacitor 204 prevents tube 200 from conducting for a period of 0.5 sec. During this delay period, rounds 16 are fired through fourth contact 110 to terminate the rotation of the cluster 24.

(3) When tube 200 conducts, the charging cycle defined more fully hereinafter is initiated.

When sequence selector switch 168 is set at the "semiautomatic" position and tube 190 is fired by the burst selector network, the following events occur:

(1) The positive voltage on the cathode of tube 190 is applied to the control grid of tube 196 through resistor 198.

(2) Tube 196 cannot conduct because the plate circuit to tubes 196 and 200 is open when the sequence selector switch is set at the "semiautomatic" position.

(3) When trigger 162 is released, relay 172 is de-energized and drops out.

(4) When relay 172 drops out, the plate circuit to tubes 196 and 200 is re-established through contacts C2 and C3 of relay 172, the arm of sequence selector switch 168, and contacts C1 and C2 of a relay 206.

(5) When the plate voltage is applied to tube 196, it conducts.

(6) The cathode voltage of tube 196 is in turn applied to the control grid of tube 200 through a resistor 202 and such tube 200 then conducts.

When tube 200 conducts, the charging cycle is initiated.

When charger 114 is to be actuated by manual charger switch 164, as is required when launcher 12 is programmed to fire in semiautomatic and automatic firing sequences, sequence selector switch 168 is set in the "manual" position. Before manual charging can be effected, trigger 162 must be released otherwise the manual changing switch is inoperative because of the open contacts C2 and C3 of relay 172.

With trigger 162 released, the following events occur when manual charging switch 164 is actuated:

(1) A relay 208 is energized and a capacitor 210 in the circuit begins to charge.

(2) When capacitor 210 is charged sufficiently (after about 50 msec.), relay 208 is de-energized and cannot be energized again until manual charging switch 164 is released to discharge capacitor 210 through a resistor 212. This provides a holding network for preventing repeated cycling of launcher 12 when manual charging switch 164 is not quickly released.

(3) When relay 208 is energized, the cathode bias on tube 200 is removed and current flows through the tube as it conducts.

(4) When tube 200 conducts, the charging cycle is initiated.

The charging cycle in the automatic multiple-burst and the semiautomatic multiple-burst sequences and in manual charging is initiated when tube 200 conducts. When tube 200 conducts, the following events occur to provide the switching action of valve 124 to control the operation of charger 114.

(1) A relay 214 and a relay 216 are energized.

(2) The circuit to front valve solenoid 125 through contacts C1 and C2 of relay 216 is completed, which actuates valve 124 to admit liquid pressure into cylinder 118 and move piston 120 forwardly (muzzleward).

(3) After crosshead 128 has traveled a short distance (approximately 0.250 in.), rear crosshead switch 154 opens and a relay 218 is de-energized.

(4) When relay 218 drops out, relay 172 is de-energized and contacts C10 and C11 and contacts C7 and C8 thereon open to disable the primary and secondary ignition circuits.

(5) As crosshead 128 continues its forward travel, cluster 24 is rotated by the displacement of cam roller 134 against the engaged one of the sloping surfaces 140. As crosshead 128 approached its forward position and tube 26, which is in the battery station, is indexed at position I, front crosshead switch 152 closes whereby relay 206 is energized to interrupt the plate circuit to tube 200 and de-energize relays 214 and 216.

(6) When relay 216 drops out, front valve solenoid 125 is de-energized and rear valve solenoid 126 is energized. This actuates valve 124 to transfer the liquid pressure from the breech end of cylinder 118 to the front or muzzleward end to actuate crosshead 128 rearwardly.

(7) As crosshead 128 nears its rearward terminal position, rear crosshead switch 154 is closed and relay 218 is re-energized.

(8) When relay 218 becomes energized, relay 172 is re-energized, closing contacts C10 and C11 and contacts C7 and C8 thereon to re-establish the primary and secondary ignition circuits. Thus, this portion of fire control circuit 112 is ready for a subsequent burst.

When relay 214 was energized, as noted above, and tube 200 conducted during the charging cycle, an antibounce circuit was completed. This antibounce circuit prevents the interruption of the ignition circuit if rear crosshead switch 154 should be bounced open by vibration during firing. The antibounce circuit includes a resistor 220 and a capacitor 221 which are connected through contacts C2 and C3 of relay 214 in a network parallel with the coil of relay 218. This increases the drop-out time of relay 218 from 1.0 msec. to 500 msec. so that the ignition circuits cannot be interrupted by the bounding of rear crosshead switch 154 unless the contacts thereof remain open longer than 500 msec.

*Operation*

In order to better understand the operation of launcher 12, refer to FIGS. 8, 10 and 12 which show diagrammatically the different positions of the followers 72 along cam groove 74 at which the followers are energized by gas pressure. Also, FIGS. 9, 11 and 12 which show diagrammatically the location of tubes 26 at which firing system 40 fires rounds 16 at the selected rate.

In the following description of an operating cycle of launcher 12, the launcher is programmed to fire in automatic multiple bursts of 100 rounds at "A" rate. Thus, burst selector switch 160 is indexed at the 100-round setting, sequence selector switch 168 is set at the "automatic" position, and rate selector switch 158 is indexed at the "A" rate setting.

When launcher 12 is in battery and ready for firing a sequence, cluster 24 is positioned so that one of the tubes 26 is located at position I. A round 16 is engaged by sprocket wheels 34 and is aligned with this tube. Drawbar 89 of the corresponding firing pin 88 is in contact with third contact 108 and the corresponding sealing sleeve 54 is cam actuated to obturate the joint made by the front end of case 18 and the breech end of the registered tube 26. The respective positions of the five followers 72 along cam groove 74, when one of the tubes is at position I, are shown as solidly outlined circles in FIG. 8. The positions of followers 72, during the firing burst, are shown in dotted outline and they will be more completely defined hereinafter.

The first burst is initiated when trigger 162 is actuated to the fire position. This energizes relay 172 to complete the first round ignition circuit to third contact 108 to discharge the first round at position I. The discharge causes rocket 14 to be propelled from case 18 and, after entry of the rocket into the aligned tube 26, the generated gas pressure is bled through port 66 into the corresponding one of the cylinders 62 to energize piston 68 therein for forward (muzzleward) travel. As the energized piston 68 moves to its extreme forward position, follower 72 associated therewith moves from position I to position V along drive section 78 of cam groove 74. Since insert 76 in which cam groove 74 is formed is fixed to receiver 30, the movement of follower 72 rotates cluster 24. This rotation is transferred to sprocket wheels 34 through shaft 35 to move the second round 16 in belt 22 into alignment with the next tube 26 in cluster 24 at zero position. The sustained rotation of cluster 24 carries such second round 16 to position II where drawbar 89 of the associated firing pin 88 contacts the energized first contact 104 for discharge of the round. When the second round 16 is discharged, the same firing sequences are repeated. However, the sustained rotation of cluster 24, produced by the discharge of the first round 16, allows follower 72 associated with the second round to travel from position II to position VIII before the gas pressure from the second round enters the associated cylinder 62. As the energized follower 72 travels from position VIII to position VI, the energy from the discharge of second round 16 is added to cluster 24 for acceleration thereof. Little, if any, energy is transferred to cluster 24 after the follower 72 passes position VI because, in the time that it takes the follower to travel from position VIII to position VI, the energy in the discharge gases is dissipated.

The sustained rotation of cluster 24, produced by the discharge of the second round 16, moves the third round in belt 22 through the battery station, and the previously recited sequence of events are repeated. However, at the instant that the third round 16 is discharged at position II, the velocity of cluster 24 is greater than when the second round was discharged. As a consequence, follower 72 associated with the third round 16 will travel from position II to position IX before the discharge gas pressure is effective against the associated piston 68. Therefore, the gas pressure energy is added to cluster 24, as the energized follower moves from position IX to position VI, and, since all the energy from the discharge gases is not dissipated by the time that follower 72 reaches position VI, a part of the energy is transferred to cam groove 74 in recovery section 80, as the follower moves from position VI to position X, and, therefore, a buffing action occurs.

Subsequent rounds 16 fired at position II accelerate cluster 24 to steady-state velocity. At steady-state velocity, rounds 16 are discharge at position II and the associated follower 72 travels from position II to position XI before the discharge gases enter the associated cylinders 62 to be effective against the cooperating pistons 68. As follower 72 travels from position XI to position VI along drive section 78 of cam groove 74, energy is added to cluster 24 with the residual energy in the discharge gases being applied to the cluster during the travel of the follower from position VI to position XII in recovery section 80 of the cam groove to provide a buffing action on the cluster.

This energy control produces equilibrium conditions that allow launcher 12 to fire at a finite rate. In event that extraneous conditions occur which cause cluster 24 to vary from its steady-state velocity, the system acts to re-establish equilibrium conditions.

When trigger 162 was actuated to initiate the burst, relay 172 was energized to complete the circuit from dynamotor 170 to third contact 108 through contacts C10 and C11 of relay 172, contacts C2 and C3 of relay 180, and contacts C2 and C3 of relay 181. The remaining rounds 16 are discharged when drawbars 89 of the associated firing pins 88 contact first contact 104. Contact 104 is energized for discharge of rounds 16 by the primary ignition circuit which extends from the network which includes resistor 177 and capacitor 178, through contacts C10 and C11 of relay 172, contacts C3 and C2 of relay 180, the selected resistor 192 of rate selector switch 158 to first contact 104. As has been explained hereinbefore, when trigger 162 is actuated, the grid voltage of tube 190 begins to increase according to the value of the selected one of the resistors 192 to where the fixed bias of the tube is overcome and the tube fires to energize relay 180 and thereby interrupt the primary ignition circuit to first contact 104 and establish the circuit to fourth contact 110.

When tube 190 fires to interrupt the primary ignition circuit and establish the circuit to fourth contact 110, the increase in positive voltage on the cathode of tube 190 is applied to the control grid of tube 196 through resistor 198, and tube 196 conducts. The cathode voltage of tube 196 increases and is applied to the control grid of tube 200 through resistor R23. However, capacitor 204 prevents tube 200 from conducting for a period of 0.5 sec. which is sufficient time for seven or eight rounds 16 to be discharged through fourth contact 110 to terminate the rotation of cluster 24.

When tube 200 does conduct, the charging cycle is initiated, as hereinbefore explained, for controlling the application of liquid pressure to charger 114 for rotating cluster 24 to index the next tube 26 at position I. At the completion of the charging cycle, when relay 218 pulls in, relay 172 is re-energized to initiate another burst. The bursts will continue automatically until belt 22 is depleted or trigger 162 is released.

When belt 22 is depleted so that a round 16 cannot be positioned by feeding mechanism 32 at the battery station, sensor 42 remains in the extended position so that belt switch 52 remains closed and relay 206 energized, whereby the plate circuit of tube 200 is disabled and the charging cycle cannot be initiated.

From the foregoing it is apparent that there is provided herein for such a launcher, as has been described, a firing system which provides a wide variety of firing sequences and which is simple and rugged in construction and positive in operation.

Although a particular embodiment of the invention has been described in detail herein, it is evident that many variations may be devised within the spirit and scope thereof and the following claims are intended to include such variations.

We claim:

1. In an automatic gun for discharging complete rounds linked together to form a belt, the combination including a receiver, a cluster composed of a plurality of firing tubes spaced equally apart around a central axis and a drum assembly for supporting the breech ends of said firing tubes, said drum assembly being journaled in said receiver for rotation around the central axis to pass said firing tubes successively through a battery station, a feeding mechanism housed in said receiver and connected to said cluster for rotation therewith for moving the belt through said receiver and positioning successive ones of the rounds relative to successive ones of said firing tubes so as to be in axial alignment therewith during passage through the battery station, a motor including a plurality of cylinders equal to the number of said firing tubes, said cylinders being disposed in said drum assembly so that the axes are parallel to the central axis of said cluster, a port extending from each of said firing tubes to a corresponding one of said cylinders for passage of discharge gases thereinto, a piston slidingly disposed in each of said cylinders for displacement by the discharge gases, a rod extending coaxially from each of said pistons, a cam follower fixed to the free end of each of said rods, a cylindrical insert fixed to said receiver at the front end, a cam groove formed inside of said insert so as to slidingly receive said cam followers, a sloping drive section of said cam groove generated so that when one of the cam followers is driven thereagainst by discharge gases said cluster is energized for rotation, a recovery section of said cam groove generated so as to displace said cam followers in an opposite direction during sustained rotation of said cluster, and an electrical firing system including a firing pin corresponding to each of said firing tubes, said firing pins being arranged for primer contact with the rounds when coaxially disposed by said feeding mechanism relative to the corresponding one of said firing tubes, a plurality of electrical contacts arranged to be successively contacted by each of said firing pins during rotation with the corresponding one of said firing tubes through the battery station and during the travel of the corresponding one of said cam followers along said drive section, and an electrical fire control circuit for selectively energizing said electrical contacts to fire the gun at a selected rate and in bursts of a selected numbeir of the rounds.

2. The combination as defined in claim 1 wherein one of said electrical contacts is positioned so as to be contacted by said firing pins when the corresponding ones of said cam followers are located in said drive section adjacent said recovery section so that the discharge gas pressure is effective against said cam followers when in said recovery section to brake the rotation of said cluster.

3. The combination as defined in claim 1 and including a trigger actuatable to a firing position, means in said electrical fire control circuit for electrically energizing a selected one of said electrical contacts a selected period of time to limit the operation of the gun to bursts of a limited duration when said trigger is actuated to the firing position, a charging device, a circuitry in said fire control circuit for automatically actuating said charging device to index the next succeeding one of said firing tubes in a starting position when the rotation of said cluster stops at the termination of each burst, a sensor positioned in said receiver for actuation from an extended to a retracted position by a round when moved by said feeding mechanism through the battery station, a switch disposed for actuation by said sensor from a closed to an open position when said sensor is actuated to the retracted position, and circuitry in said fire control circuit disposed in cooperation with said switch for disabling said automatic actuating circuitry when said switch is in the closed position.

4. The combination as defined in claim 1 including a trigger actuatable to a firing position, a charger device provided with a cylinder, a piston slidingly disposed in said cylinder, means for introducing liquid pressure into opposite ends of said cylinder to actuate said piston in opposite directions, solenoid means for selectively controlling the liquid pressure into opposite ends of said cylinder, a cam roller connected to said piston for displacement therewith, a cylindrical sleeve bracketed to said cluster for rotation therewith, a cam track formed on said sleeve, said cam track including a sloping surface and a joining longitudinal channel respective to each of said firing tubes, said sloping surface being disposed for engagement by said cam roller when said charger piston is energized to rotate the corresponding one of said firing tubes to a starting position wherein the corresponding one of said firing pins is in contact with one of said electrical contacts, and wherein said fire control circuit includes means for electrically energizing a selected one of said firing pins for a selected period of time to limit the operation of the gun to bursts of a limited duration when said trigger is actuated to the firing position, means for automatically energizing said solenoid means for actuating said charger to index the next succeeding one of said firing tubes in said cluster at the starting position at the end of a firing burst, and means for initiating another burst when said trigger remains actuated to the firing position.

5. The combination as defined in claim 1 wherein said electrical contacts are positioned so as to be successively contacted by said firing pins when the corresponding ones of said cam followers are progressively positioned along said drive section whereby the period of time during which the energy of the discharge gases is applied to said cluster is selectively varied to selectively vary the firing rate of the gun, and wherein one of said electrical contacts is positioned to be contacted by said firing pins when the corresponding ones of said cam followers are located in said drive section adjacent said recovery section so that the energy of the discharge gases is effective against said cluster when the energized one of said cam followers is in said recovery section to brake the rotation of said cluster.

6. The combination as defined in claim 5 wherein said firing system includes a trigger actuatable to a firing position and said fire control circuit includes a primary ignition circuit for circuiting electrical energy to a selected one of said electrical contacts when said trigger is actuated to the firing position and a secondary ignition circuit for circuiting electrical energy when said trigger is released to said one of said electrical contacts which is contacted by said firing pins when the corresponding one of said cam followers is located in said drive section adjacent said recovery section.

7. An automatic gun for discharging complete rounds linked together to form a belt, said gun including in combination a receiver, a cluster composed of a plurality of firing tubes spaced equally apart around a central axis, said cluster being journaled to said receiver for rotation around the central axis to pass said firing tubes successively through a battery station, a feeding mechanism housed in said receiver and connected to said cluster for rotation therewith for moving the belt through said receiver and positioning successive ones of the rounds relative to said successive ones of said firing tubes so as to be in axial alignment therewith during passage through the battery station, a piston motor energized by gases generated by discharge of the rounds and adapted to rotate said cluster, an electrical firing system composed of an electrically energized firing pin disposed relative to each of said firing tubes so as to contact for discharge the round in alignment therewith at the battery station and a plurality of arcuately arranged electrical contacts disposed at the rear end of said receiver for contact by said firing pins at different positions during passage of said firing pins through the battery station, cooperating means in said motor and said firing system for firing the gun at selected rates, and means in said firing system for firing the gun in bursts of a selected number of the rounds.

References Cited by the Examiner

UNITED STATES PATENTS

| | | | |
|---|---|---|---|
| 2,756,639 | 7/1956 | Bird | 89—126 |
| 2,831,402 | 4/1958 | Taslitt | 89—129 X |
| 2,847,908 | 8/1958 | Boals | 89—1 |
| 2,959,106 | 11/1960 | O'Brien | 89—126 |
| 3,017,807 | 1/1962 | Grover | 89—12 |
| 3,041,939 | 7/1962 | Dardick | 89—12 |

BENJAMIN A. BORCHELT, *Primary Examiner.*

SAMUEL W. ENGLE, *Examiner.*